United States Patent Office 3,546,152
Patented Dec. 8, 1970

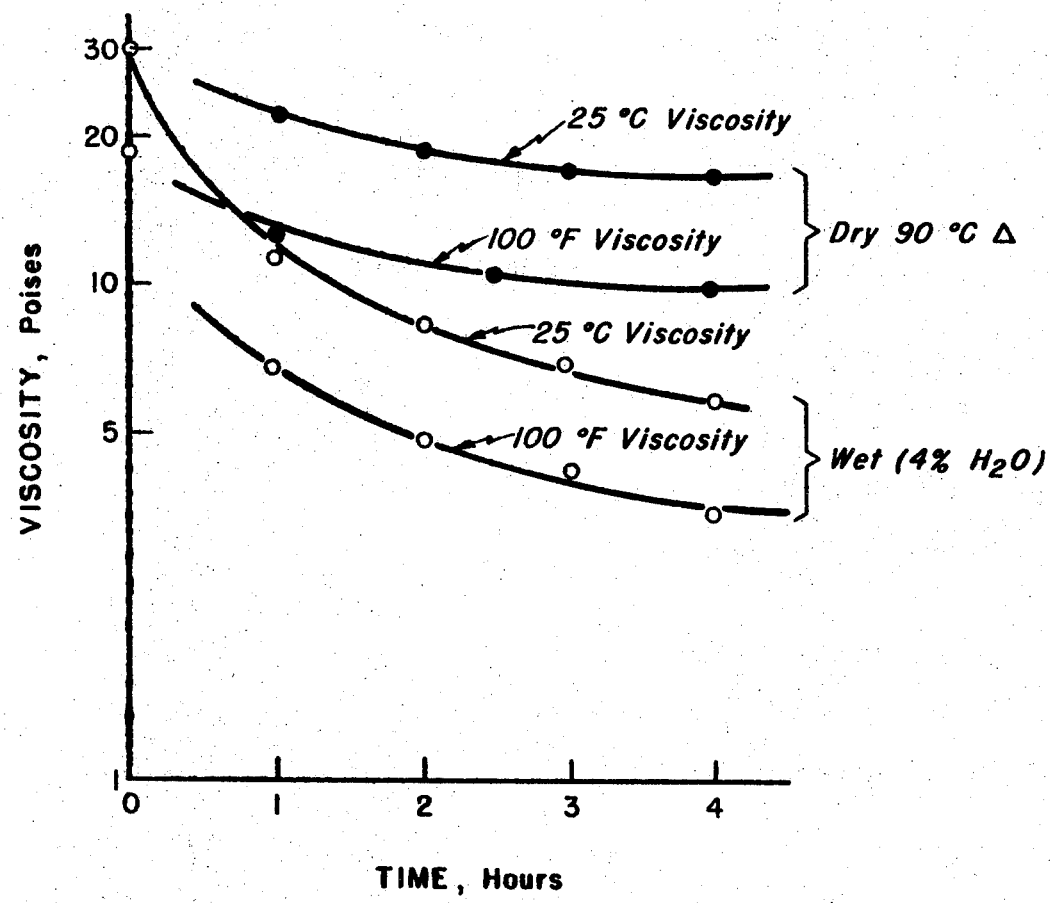

3,546,152
PROCESS FOR REDUCING VISCOSITY OF
POLYTRIMELLITAMIDE-IMIDE SOLUTION
Benjamin A. Bolton, Chester, Ind., assignor to Standard
Oil Company, Chicago, Ill., a corporation of Indiana
Filed Aug. 6, 1968, Ser. No. 750,661
Int. Cl. C08g 51/24
U.S. Cl. 260—29.2    8 Claims

ABSTRACT OF THE DISCLOSURE

A process for reducing the viscosity of an aromatic polytrimellitamide-imide polymer solution, thus increasing the storage stability of the polytrimellitamide-imide solution and providing smooth coatings from solutions and reducing the volatile contents in a resin-fiberglass laminate. The polytrimellitamide-imide solutions are useful for producing wire enamel coatings and fiberglass laminates.

This invention relates to a novel process for reducing the viscosity of polytrimellitamide-imide solutions. Lower viscosity solutions are desirable for increasing storage stability to permit the use of less solvents, give smooth coatings from the solution or reduce the volatile contents in a resin-fiberglass laminate. Prior to this invention lower viscosity polymers, usually with low molecular weights, had poor physical properties and tended to make poor wire enamel coatings. This invention describes a process by which lower solution viscosity is obtained without sacrificing the properties of the finished product, such as wire enamel or fiberglass laminate.

My process involves heating a solution of aromatic polytrimellitamide-imide polymer at about 70 to 150° C. in the presence of about 1 to 10% of water based on the solution. The aromatic polytrimellitamide-imide solution comprises about 15 to about 50% of said polytrimellitamide-imide and the organic polar solvent. As can be seen from the attached figure the heating in the presence of water reduces solution viscosity more rapidly than just heating the anhydrous solution. Films cast and cured from treated solutions are tough and flexible and show no sign of polymer degradation. The effect of water for effectively reducing viscosity without irreversible harm to the polymer structure is unexpected since the prior art has shown that polyamide-imide polymers are rapidly degraded in the presence of water. See the article by L. W. Frost and I. Kesse "Spontaneous Degradation of Aromatic Polypyromellitamic Acids," Polymer Preprints, ACS Division of Polymer Chemistry No. 1, 369 (1963).

The polytrimellitamide-imide polymers may be described as polyamides having some polyamide linkages; said polyamide are capable, when heated, of conversion to the polyamide-imide form. Such polyamides are high molecular weight polymeric compounds having in their molecules units of:

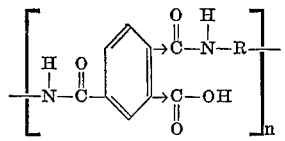

wherein → denotes isomerism and wherein R is a divalent aromatic organic radical. This organic radical consists of R', which is a divalent aromatic hydrocarbon radical or two R' divalent aromatic hydrocarbon radicals joined by stable linkages —O—, —CH$_2$—,

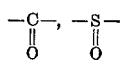

and —S—, as are in the groups —R'—, O—R', —R'—CH$_2$—R'—,

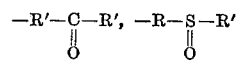

and R'—S—R'—. The molecular weight of these polyamides is sufficiently high to produce upon heating a film-forming polymer. Said amides are susceptible to condensation by heating to a polyamide-imide having to a substantial extent recurring units of:

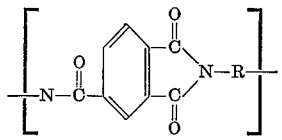

wherein R is a divalent aromatic radical in which in addition to hydrogen, nitrogen, sulfur and oxygen atoms can be attached to the carbon atoms. This organic radical consists of R', which is a divalent aromatic hydrocarbon radical or two R' divalent aromatic hydrocarbon radicals joined by stable linkages —O—, —CH$_2$—,

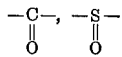

and —S—, as are in the groups —R'— O—R'—, —R'—CH$_2$—R'—,

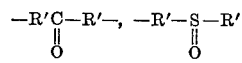

and R'—S—R'—.

The polymers are advantageously prepared by reacting acid halide derivative of trimellitic acid anhydride and aromatic diamine. Such polyamide-imides broadly include two types of useful polymeric products. One type, as indicated above is the "polyamides," wherein the linking groups are probably predominantly amido although some may be imido and wherein the polymeric contains free carboxyl groups which are capable of further reaction. The other type, the polyamide-imides, are the polyamide polymers which have been subjected to further heat treatment and haves no free carboxyl group but usually have a significantly higher molecular weight. The polyamides, as formed, have from 0 to 45% imide linkages. Preferably, the percent imide linkages is controlled to about 20% or less in order to provide better solubility permitting easier handling of the product. The polyamide-imides, after heat curing, theoretically contain 50% amide linkages and 50% imide linkages, although the relative proportions and the relative degree of imidization may be increased by further cross-linking.

Another way of producing polyamide-imides is by reacting trimellitic acid anhydride with an aromatic diisocyanate compound in an organic polar solvent medium, while continuously removing the carbon dioxide formed from the condensation reaction.

The first type of the polyamides of the invention may be regarded as polyamides which are soluble in organic solvents and are capable of further reaction upon application of heat. They may be employed in solution, in high solids' suspension, or as powders in the production of coatings, laminates, films, fibers, molded products and as impregnating varnishes. The second type of polymers—the polyamide-imides—are much less soluble than the amides and when they have been heat cured they are generally insoluble in organic solvents and may be regarded as cured end-products in the way of coatings, laminates, films, enamel-wire coatings and the like. The latter are characterized by resistance to solvents, by high thermal stability and good electrical characteristics.

Infrared analyses of the soluble polyamides have shown optical densities as 6.02 N(amide carbonyl) of up to about 10-11 times those at 5.61 N(imide carbonyl) indicating the presence of a high amide content in a comparison to the imide content of the polyamide. The infrared data also indicate the presence of carboxyl groups, although determination of their amount is hindered by the close position of the wave length of absorption for the imide carbonyl group.

Infrared analysis of some of the insoluble polymers shows an amide to imide ratio of about 1, indicating that the amide content of the soluble polyamide has been reduced to about 50% and the imide content has been increased to about 50%. Th data also indicate that carboxyl groups are present, if at all, in only small amounts in the insoluble polymers.

The polymeric products are prepared from an acyl halide derivative to trimellitic anhydride (1,2,4-benzene tricarboxylic acid anhydride), having at least one acyl halide and that in the 4-ring position, which include derivatives such as the 4-acid chloride, 1,4- and 2,4-diacid chloride. The bromide and other reactive halide-derivatives are also suitable.

The acyl halide derivative is reacted with an aromatic diamine having one or more aromatic rings and two primary amino groups. These aromatic diamines have the formula $H_2N-R'-NH_2$, $H_2N-R'-O-R'-NH_2$, $$H_2N-R'-CH_2-R'-NH_2$$

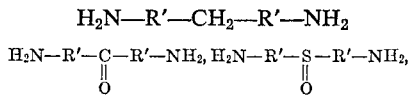

and $H_2N-R'-S-R'-NH_2$ wherein R' is a divalent aromatic hydrocarbon radical hereinbefore indicated. The aromatic content of the diamine provides the thermal properties in the polymer while the primary amino groups permit the desired imide rings and amide linkages to be formed in the polymer. Generally the aromatic diamine has from one to about four aromatic rings, advantageously from one to about two aromatic rings. The aromatic diamines having more than one aromatic ring may be further characterized as polycyclic aromatic compounds having two primary amino groups on an interconnected polycyclic aromatic nucleus. The aromatic rings may be interconnected by condensation, as in naphthalene or in phenanthrene-type structures, or may be bridged, either directly as in diphenyl diamines, or indirectly as, for example, two R' groups are joined with reactive stable inert linkages such as oxy, methylene, ethylene or 1,1-dimethylmethylene, carbonyl, sulfonyl and other relatively inactive groups such as sulfide groups as hereinbefore described. Suitable nuclei (R' divalent aromatic hydrocarbon radical) include phenylene, naphthalene anathrylene, naphthacenylene and the like; diphenylene, terphenylene, phenylnaphthalene, quaterphenylene and the like; and aromatic rings separated by oxy, methylene, ethylene, 1,1-dimethylmethylene, carbonyl, sulfonyl and thio groups.

Advantageously, the linkages between the aromatic groups are oxy, or methylene, and the amino groups are in the metal or para position in the aromatic nucleus. Preferable diamines are p,p'-methylenebis(aniline), p,p'-oxybis(aniline) and m-phenylenediamine, particularly for the preparation of wire enamels.

Usually, the reaction is carried out in the presence of a polar organic solvent such as N,N-dimethylacetamide, N-methylpyrrolidone, N,N-dimethylformamide, dimethylsulfoxide and the like, with N,N-dimethylacetamide and N-methylpyrrolidone being preferred. However, phenol and substituted phenols, such as ortho, meta, para-cresol can also be used. The reaction is suitably carried out under substantially anhydrous conditions and at a temperature below about 150° C. and advantageously at about 50° C., although temperatures down to about 6° C. are also very suitable. The time of reaction depends primarily on the temperature, varying from about 1-24 hours, with 2 to 4 hours at 40-60° C. recommended. The structure of the amine also affects the rate of reaction.

The reactants are preferably present in essentially an equimolar ratio. Variation with limits of plus or minus three mole percent of either starting material will usually have only minor effects on product properties. Variations as high as plus or minus ten mole percent may be suitable for less demanding applications than wire coating enamels from the standpoint of high flexural requirements.

The initial reaction between the acyl halide derivative of trimellitic anhydride and the diamine results in a high molecular weight polyamide having an amide content of greater than about 50% of the linking units in the polymer. The amide content varies from 55 to 100% and the imide content is from 0 to 45%. Such products are readily soluble in such organic solvents as dimethylacetamide, N-methylpyrrolidone, N,N-dimethylformamide, N,N-dimethylsulfoxide, phenol, ortho, meta, para-cresol and the like.

The process of this invention can be applied either to the polyamide-imide polymer dissolved in its polymerization solvent or the polymerization solutions may be blended with generally less costly diluents. Solubility of the polymer in these diluted blends will, of course vary, but generaly the ratio of active solvent to diluent will be about 1:1 to 3:1. In contradistinction to diluents, co-solvents may be used to prepare solutions. Co-solvents are those solvents that impart some desirable application property to the fully formulated polymer solution. Illustrative of these would be: pseudocumene, naphthalene, dimethylbenzene, 1,2,3-trimethyl benzene.

The foregoing diluents and co-solvents were described as being blended with the polymerization solvent. But wherein the polymer solution is prepared from polyamide-imide precipitated from its polymerization media, washed and dried, the blending to a desired solvent composition may be accomplished as exemplified in Example IV and the thus formulated polymer solution is equally amenable to the process of this invention.

An aromatic polytrimellitamide-imide solution, suitable for producing a wire coating at elevated temperatures, said solution comprising 15 to 50 weight percent of said polytrimellitamide-imide is heated to about 70 to 150° C. In the presence of water. The amount of water present is about 1 to 10 weight percent of the total solutions. After the polytrimellitamide-imide solution has been treated according to the invention of this process the viscosity drops from an initial viscosity of about 41.3 to 148 to about 2.4 to 8.2. This clearly shows the effect of the novel process on the final viscosity of the solution. The attached drawing shows that heating in the presence of water reduces the solution viscosity more rapidly than just heating the anhydrous solution. The novel process is highly effective in lengthening the storage stability for wire enamel solutions made from the aforementioned polytrimellitamide-imides. All enamel solutions after a period of time tend to increase in viscosity and finally lose their utility as wire coatings for electrical and other copper or metal wires. By reducing the viscosity it is also possible to treat a higher viscosity aged wire enamel solution made from the polytrimellitamide-imide derived from trimellitic anhydride, containing about 15 to 50% by weight of the polymer, by heating this aged wire enamel solution at a temperature of 70 to 150° C. in the presence of 1 to 10% of the solution of water.

The reduced viscosity solutions prepared according to the novel process of the instant invention are useful for wire enamels for the protection of electrical conductors, metallic wire such as copper and also useful for the formation of a variety of heat resistant films and coatings.

The following examples illustrate some embodiments of this invention. It will be understood that these are for illustrative purposes only and do not purport to be wholly definitive with respect to conditions or scope.

EXAMPLE I 1960 parts by weight of N-methylpyrrolidone was charged to a 5 liter glass flask equipped with stirrer and inert gas ($N_2$) inlet at 25° C. 457 parts by weight of metaphenylene diamine was added and stirred to dissolve. 892 parts by weight of 4-trimellitoyl chloride was added over a three hour period and temperature controlled to hold 35° C. At this point, 178 parts by weight of N-methyl pyrrolidone was added to wash down any undissolved solid. The solution was held at 35° C. for 2 hours, then cooled in an ice bath to 27° C. A solution of 271 parts by weight of propylene oxide in 271 parts by weight of N-methyl pyrrolidone was added dropwise through the reflux condenser to the viscous polymer solution. The temperature was held at 26.5 to 29° C. by cooling and controlling the rate of propylene oxide. This took about 6½ hours. The product was allowed to stand overnight, then heated to 90° C. for about 1 hour to reduce the viscosity from 570 poises to 148 poises.

EXAMPLE II 2920 parts by weight of dimethyl acetamide were charged to a reactor. 443.3 parts by weight of metaphenylene diamine was added. The temperature of the solution was 64° F. 865 parts by weight of 4-trimellitoyl chloride was added over a 220-minute period. Cooling water was used on the jacket to control the maximum solution temperature to 95° F. The polymer solution was agitated without cooling for 165 minutes. At this point, it had a Gardner viscosity of Z-4. The solution was precipitated in water and chopped to a granular product in a Fitzmill. The solid polymer was washed 3 times, centrifuged and dried in a steam heated rotary dryer. The polymer had a final moisture content of 14.45% by weight.

EXAMPLE III 3361 parts by weight of N-methylpyrrolidone and 1199 parts by weight of semi-refined coal-tar distillate, having a boiling range of 165 to 235° C. were charged to a lined reactor equipped with an agitator cooling-heating jacket and a nitrogen gas inlet tube. 886 parts by weight of methylene dianiline were dissolved in the solvents. At this point, the solution temperature was 62° F. 940 parts by weight of 4-trimellitoyl chloride was added over a 5-hour period with cooling water on the jacket. At the end of the addition, the solution temperature had risen to 90° F. The solution was stirred for 55 minutes, and the addition of a solution of 299 parts by weight of propylene oxide in 234 parts by weight of N-methylpyrrolidone was begun. The reaction mass temperature was controlled by cooling water over the 125-minute addition period to a maximum of 105° F. The solution was allowed to sit overnight without agitation. It was then heated to 190° F. and held at this temperature for 100 minutes. The solution was cooled to 170° F. and 493 parts by weight of sample was withdrawn for special test purposes. 134 parts by weight of a semi-refined coal-tar distillate and 310 parts by weight of N-methylpyrrolidone were then added to cool and dilute the product. The product was filtered and collected. The filtrate temperature was 130° F.

EXAMPLE IV 187 parts by weight of m-phenylene diamine-type polymer of Example II were dissolved in 363 parts by weight of N-methylpyrrolidone with stirring at room temperature. The solution was filtered and placed in containers.

Samples of the polymer solutions prepared in Examples I, III and IV were heated at 90° C. for about 16 hours in the presence of varying amounts of water. The conditions of treatment and the effect on solution viscosity are tabulated below. The results are shown also in the drawing (FIG. I).

| Type of solution | Percent by weight of water on total solution | | | | |
|---|---|---|---|---|---|
| | 0 | 1 | 2 | 4 | 10 |
| (A) Example IV: | | | | | |
| Initial visc. (poises) | 95 | 95 | 95 | 95 | 95 |
| Final visc. (poises) | 27 | 19.6 | 15 | 111.5 | 7 |
| (B) Example III: | | | | | |
| Initial visc. (poises) | 41.3 | 41.3 | 41.3 | 41.3 | 41.2 |
| Final visc. (poises) | 14.9 | 8.2 | 7.3 | 6.8 | 2.4 |
| (C) Example I: | | | | | |
| Initial visc. (poises) | 148 | 148 | 148 | 148 | 148 |
| Final visc. (poises) | 53 | 32.5 | 21.5 | | 8.3 |

Films were prepared by spreading the solutions on glass plates with a No. 40 wire wound rod and baking the film 5 minutes at 600° F. After cooling, the films were removed from the plates and tested for toughness by creasing. None of the water-treated films lost their initial toughness of "creasability."

I claim:
1. A process for reducing the viscosity of aromatic poly-trimellitamide-imide solutions containing about 15 to 50 weight percent of said polytrimellitamide-imide and having as at least one component of the solvent, an organic polar solvent, suitable for producing high-temperature wire coatings and laminating solutions, said process comprising the heating of the polytrimellitamide-imide solution at a temperature of about 70 to 150° C. in the presence of 1 to 10 weight percent of water based on the solution.

2. A process for reducing the viscosity of aromatic polytrimellitamide-imide solutions containing about 15 to 50 weight percent of said polytrimellitamide-imide prepared by reacting aromatic primary diamines with the 4-acid halide of trimellitic acid anhydride in an organic polar solvent selected from the group consisting of nitrogen and sulfoxide containing polar solvents and phenol or substituted phenols, said process comprising the heating of the polytrimellitamide-imide solution at a temperature of about 70 to 150° C. in the presence of 1 to 10 weight percent of water based on the solution.

3. The process of claim 2 wherein the 4-acid halide of trimellitic acid anhydride is the 4-acid chloride of trimellitic anhydride.

4. The process of claim 3 wherein the aromatic diamine is p,p'-methylenebis(aniline).

5. The process of claim 3 wherein the aromatic diamine is p,p'-oxybis(aniline).

6. The process of claim 3 wherein the aromatic diamine is m-phenylenediamine.

7. The process of claim 3 wherein the organic polar solvent is N-methylpyrrolidone.

8. The process of claim 3 wherein the organic polar solvent is N,N-dimethylacetamide.

References Cited

UNITED STATES PATENTS

| 3,179,631 | 4/1965 | Endrey | 260—78 |
| 3,190,856 | 6/1965 | Lavin et al. | 260—65 |
| 3,242,136 | 3/1966 | Endrey | 260—47 |
| 3,440,196 | 4/1969 | Boldebuck et al. | 260—29.2 |
| 3,440,197 | 4/1969 | Boldebuck et al. | 260—29.2 |
| 3,440,215 | 4/1969 | Holub | 260—78 |
| 3,448,068 | 6/1969 | Holub et al. | 260—29.2 |

JOHN C. BLEUTGE, Primary Examiner

U.S. Cl. X.R.

117—128.4, 232; 260—30.4, 30.8, 32.6, 33.4, 33.6, 47, 65, 78